(12) United States Patent
Herfst et al.

(10) Patent No.: US 12,117,467 B2
(45) Date of Patent: Oct. 15, 2024

(54) PROBE CHIP, SCAN HEAD, SCANNING PROBE MICROSCOPY DEVICE AND USE OF A PROBE CHIP

(71) Applicant: Nederlandse Organisatie voor toegepast-natuurwetenschappelijk onderzoek TNO, 's-Gravenhage (NL)

(72) Inventors: Roelof Willem Herfst, Capelle aan den IJssel (NL); Anton Adriaan Bijnagte, Tricht (NL); Albert Dekker, Delft (NL); Jan Jacobus Benjamin Biemond, Barendrecht (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/256,914

(22) PCT Filed: Jul. 5, 2019

(86) PCT No.: PCT/NL2019/050421
§ 371 (c)(1),
(2) Date: Dec. 29, 2020

(87) PCT Pub. No.: WO2020/009582
PCT Pub. Date: Jan. 9, 2020

(65) Prior Publication Data
US 2021/0278436 A1 Sep. 9, 2021

(30) Foreign Application Priority Data
Jul. 6, 2018 (EP) ..................... 18182254

(51) Int. Cl.
*G01Q 70/02* (2010.01)
*G01Q 70/10* (2010.01)

(52) U.S. Cl.
CPC ............ *G01Q 70/02* (2013.01); *G01Q 70/10* (2013.01)

(58) Field of Classification Search
CPC ..................................... G01Q 70/02
See application file for complete search history.

(56) References Cited

U.S. PATENT DOCUMENTS 5,103,095 A 4/1992 Elings et al.
6,298,715 B1 * 10/2001 Thomson ............... G01Q 20/02
250/307

(Continued)

FOREIGN PATENT DOCUMENTS

EP 1530220 A1 5/2005
EP 1667164 A1 6/2006

(Continued)

OTHER PUBLICATIONS

European Patent Office, International Search Report in corresponding International Application No. PCT/NL2019/050421, dated Oct. 2, 2019 (3 pages).

*Primary Examiner* — Eliza W Osenbaugh-Stewart
(74) *Attorney, Agent, or Firm* — Leydig, Voit & Mayer, Ltd.

(57) ABSTRACT

The present document relates to a probe chip for use in a scanning probe microscopy device for holding a probe mounted thereon. The probe chip includes a carrier element having a probe bearing side which is configured for bearing the probe to be extending therefrom as an integral or mounted part thereof. The carrier element further comprises a mounting side configured for mounting the probe chip onto a scan head of the scanning probe microscopy device, wherein the mounting side extends in a longitudinal and lateral direction of the carrier element to be substantially flat. The carrier element towards the probe bearing side thereof is truncated in the lateral direction on either side of a (Continued)

longitudinal axis through a center of the carrier element, such as to enable a rotation of the probe chip over a rotation angle around the longitudinal axis in use when the longitudinal axis is inclined at an inclination angle relative to a substrate surface to be scanned and when the probe is in a measurement position relative to the substrate surface.

18 Claims, 10 Drawing Sheets

(56) References Cited

U.S. PATENT DOCUMENTS

| | | | |
|---|---|---|---|
| 8,844,061 B2 | 9/2014 | Baba et al. | |
| 9,372,203 B1 | 6/2016 | Massie | |
| 2009/0241233 A1* | 9/2009 | Sulzbach | B82Y 35/00 |
| | | | 850/40 |
| 2010/0037360 A1* | 2/2010 | Jo | G01Q 70/02 |
| | | | 850/52 |

FOREIGN PATENT DOCUMENTS

| | | |
|---|---|---|
| EP | 2104111 A1 | 9/2009 |
| EP | 3226009 A1 | 10/2017 |
| WO | WO 2013/050770 A1 | 4/2013 |
| WO | WO 2015/197398 A1 | 12/2015 |

* cited by examiner

PROBE CHIP, SCAN HEAD, SCANNING PROBE MICROSCOPY DEVICE AND USE OF A PROBE CHIP

CROSS-REFERENCE TO RELATED APPLICATIONS

This patent application is a U.S. National Phase of PCT International Application No. PCT/NL2019/050421, filed Jul. 5, 2019, which claims priority to European Application No. 18182254.5, filed Jul. 6, 2018, which are both expressly incorporated by reference in their entireties, including any references contained therein.

FIELD OF THE INVENTION

The present invention is directed at a probe chip for use in a scanning probe microscopy device for holding a probe mounted thereon, the probe chip including a carrier element having a probe bearing side, the probe bearing side being configured for bearing the probe to be extending therefrom as an integral or mounted part thereof, the carrier element further comprising a mounting side configured for mounting the probe chip onto a scan head of the scanning probe microscopy device, wherein the mounting side extends in a longitudinal and lateral direction of the carrier element to be substantially flat, wherein the longitudinal direction is defined as a direction parallel to or coinciding with a direction wherein the probe is to be extending from the probe bearing side, and wherein the lateral direction is transverse to the longitudinal direction and transverse to a thickness of the carrier element. The invention is further directed at a scan head, a scanning probe microscopy device and the use of a probe chip as defined above.

BACKGROUND

A scanning probe microscopy device serves to map nanostructures on a sample surface of a sample. Such a device may comprise a probe for scanning the surface of an object, and one or more motion actuators for enabling motion of the probe relative to the sample. In one embodiment a probe comprises a probing tip mounted on a cantilever arranged for bringing the probing tip in contact with or in close proximity to the sampling surface for enabling the scanning, and a Z-position detector for determining a position of the probing tip along a Z-direction when the probing tip is in contact with the sample surface (herein the Z-direction is a direction transverse to the sample surface).

Scanning probe microscopy (SPM) devices, such as atomic force microscopy (AFM) devices as described above are for example applied in the semiconductor industry for scanning of semiconductor topologies on a surface. Other uses of this technology are found in biomedical industry, nanotechnology, and scientific applications. In particular, measurements with a microscopic probe may be used for critical metrology (CD-metrology), profilometry, particle scanning and defect review, stress- and roughness measurements. AFM microscopy allows visualization of surfaces at very high accuracy, enabling visualization of surface elements at sub-nanometer resolution.

Using a conventional AFM system, small surface structures with dimensions in the order of nanometers or tens of nanometers may be followed well to enable sensing and mapping of these structures. However, as a pre-requisite using a conventional probe or conventional AFM system, these structures must be sufficiently shallow to allow the tip to follow the three dimensional shape (including the shape of the sidewalls) accurately. Therefore, in this respect, the technology is limited as large step-ups or step downs, or deep trenches, cannot be followed with sufficient accuracy using a standard probe.

The above has led to the development of high aspect ratio (HAR) probes and associated measuring methods, to increase the range of steepness and depth of the structures that may be accurately sensed. A HAR type probe has a probe tip and cantilever that are specifically designed to follow the more challenging geometries of steep and deep surface structures. However, as may be appreciated, there is a limit also to the type of structures that may be sensed using the presently available HAR type probes. If trenches become too deep and too narrow, even the presently available HAR probes and measuring methods fail to perform an accurate mapping thereof.

SUMMARY OF THE INVENTION

It is an object of the present invention to overcome the abovementioned disadvantages and to extend the aspect ratio range of surface structures that can be accurately measured and mapped by an atomic force microscope.

To this end, in a first aspect thereof, there is provided herewith a probe chip for use in a scanning probe microscopy device for holding a probe mounted thereon, the probe chip including a carrier element having a probe bearing side, the probe bearing side being configured for bearing the probe to be extending therefrom as an integral or mounted part thereof, the carrier element further comprising a mounting side configured for mounting the probe chip onto a scan head of the scanning probe microscopy device, wherein the mounting side extends in a longitudinal and lateral direction of the carrier element to be substantially flat, wherein the longitudinal direction is defined as a direction parallel to or coinciding with a direction wherein the probe is to be extending from the probe bearing side, and wherein the lateral direction is transverse to the longitudinal direction and transverse to a thickness of the carrier element, wherein the carrier element towards the probe bearing side thereof is truncated in the lateral direction on either side of a longitudinal axis through a center of the carrier element, such as to enable a rotation of the probe chip over a rotation angle around the longitudinal axis in use when the longitudinal axis is inclined at an inclination angle relative to a substrate surface to be scanned and when the probe is in a measurement position relative to the substrate surface.

The present invention applies a truncation of the probe chip at least over a part of the thickness of the carrier element, extending from a surface facing side thereof and narrowing the carrier element towards the probe bearing side thereof. This provides room for enabling rotation of the probe chip without touching the surface of a substrate, and thereby increases the possible angles of rotation around the longitudinal axes at any inclination angle of the probe chip.

Large truncations that extend over a substantial part of the surface of the carrier element (i.e. the substrate facing surface) in particular enable such rotation at very small inclination angles of only few degrees. In accordance with some embodiments, the inclination angle is smaller than 20 degrees, preferably smaller than 15 degrees, more preferably smaller than 10 degrees, and even more preferably smaller than or equal to 5 degrees. Moreover, in accordance with certain embodiments, the rotation angle, in either a positive or a negative rotation direction, is between 0 and 10 degrees, preferably between 0 and 15 degrees, more preferably between 0 and 20 degrees, and even more preferably between 0 and 50 degrees. In particular at low angles of inclination and rotation, the tip half-cone angle is compensated by the rotation, but the aspect ratio of the trench is not yet limited by the rotation itself. On the other hand, if the structure can accommodate larger rotation, the tip is more perpendicular to the sidewall so that the interaction is more with the end-point of tip and less with the side of the tip.

In accordance with some embodiments, the truncation of the carrier element towards the probe bearing side thereof is provided by cut-out portions on either side of the longitudinal axis. For example, in some embodiments, wherein the probe comprises a cantilever and a probe tip, and wherein the cut-out portions result in the carrier element at the probe bearing side thereof comprising a narrow end portion, wherein the narrow end portion, at least at a location from where probe extends, has a width that is smaller than or equal to 10 times a width of the cantilever, preferably smaller than or equal to 5 times the width of the cantilever, more preferably smaller than or equal to 2 times the width of the cantilever, and even more preferably equal to the width of the cantilever. This thereby forms a narrow end portion that allows rotation of the probe.

In accordance with some embodiments, the truncation of the carrier element towards the probe bearing side thereof is provided by recess portions, wherein the recess portions at least partly reduce the thickness of the carrier element, such that a further part of the carrier element is present contiguous to the recess portions in the direction of thickness of the carrier element. Here, the recess portions leave wing sections on the carrier element that contribute to the mechanical stability and integrity of the probe chip, without diminishing it's ability to enable rotation around the longitudinal axis.

Moreover, in accordance with embodiments, a shape of the recess portions in the lateral and longitudinal directions is at least one of a group of: triangular, trapezoid, rectangular, or parallelogram shaped.

In some embodiments, the probe bearing side comprises the probe extending therefrom as an integral part, and wherein the probe comprises a cantilever and a probe tip, the cantilever being configured for deformation upon exerting thereon a lateral force. In particular, the probe and cantilever may be optimized to allow torsional deformation at even very small lateral forces on the probe chip, making the probe highly sensitive to such forces. Attractive or repulsive side forces on the probe tip at atomic distances thereby become measurable. Thus in certain embodiments, said deformation of the cantilever responsive to the lateral force is at least one of: a torsional or a lateral deformation.

In a second aspect thereof, the invention is directed at a scan head for use in a scanning probe microscopy device for holding a probe chip in accordance with the first aspect, wherein the scan head comprises a mounting arrangement for enabling mounting of the probe chip onto the scan head, and wherein the mounting arrangement cooperates with the probe chip for fixing the probe chip in use.

The scan head, in accordance with some embodiments, is further arranged for rotating the probe chip over a rotation angle around the longitudinal axis, when the longitudinal axis is inclined at an inclination angle relative to a substrate surface to be scanned and when the probe is in a measurement position relative to the substrate surface. Reference is made to the description above and below, which describe the benefits of enabling such rotation.

In accordance with some embodiments of the scan head, the mounting arrangement is at least one of: a mechanical clamp for clamping the carrier element, a vacuum clamp including a suction element cooperating with a surface of the carrier element for fixing the probe chip, an electrostatic clamp including a clamping electrode for applying an electric field for exerting an electrostatic force on the carrier element. In particular a vacuum clamping arrangement or an electrostatic clamping arrangement directly cooperates with the probe chip's mounting side and is free of any elements on the substrate facing side of the probe chip. Thus, such a mounting arrangement does not prevent the rotation of the probe chip around the longitudinal axis in any way, and thereby advantageously is applied in combination with the probe chip of the present invention.

In accordance with a third aspect, there is provided a scanning probe microscopy device, the scanning probe microscopy device comprising a probe chip according to the first aspect, or a scan head according to second aspect.

The invention is further directed, in accordance with a fourth aspect thereof, to the use of a probe chip according to the first aspect in a scanning probe microscopy method for mapping one or more surface structures on a surface of a substrate, comprising rotation of the probe chip over a rotation angle around the longitudinal axis in use when the longitudinal axis is inclined at an inclination angle relative to a substrate surface to be scanned and when the probe is in a measurement position relative to the substrate surface.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
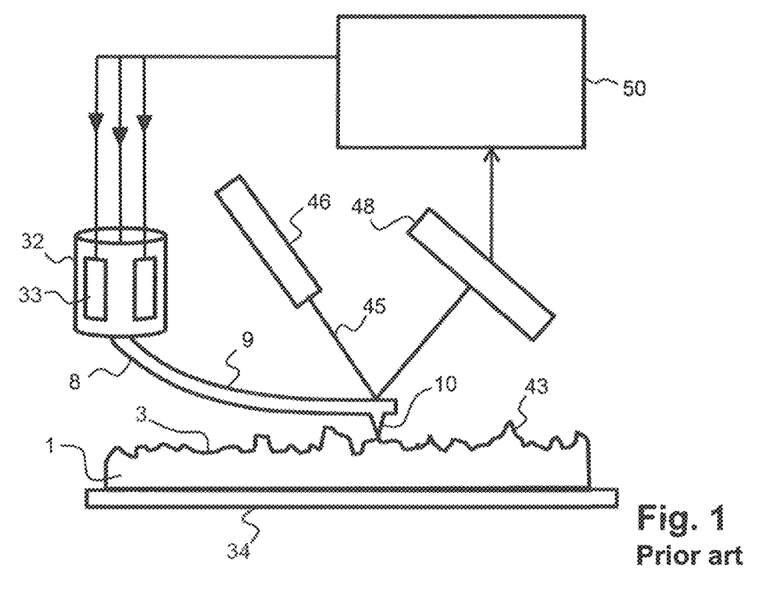
FIG. 1 schematically illustrates the working principle of a typical prior art atomic force microscope.

FIG. 1 schematically illustrates the working principle of a typical prior art atomic force microscope. In FIG. 1, a scan head 32 comprises piezo type drivers 33 for the X-, Y-, and Z-directional motion of a probe 8. The probe 8 consists of a cantilever 9 having a probe tip 10 arranged for scanning a sample surface 3 of a sample 1. Although not illustrated n FIG. 1, the probe 8 typically extends from a probe chip (not shown in FIG. 1), wherein the probe chip has proper dimensions for mounting it to the scan head 32 by means of a clamp (not shown). A conventional design probe chip 7 is schematic illustrated in FIG. 5, and comprises a carrier element 13 having a mounting side 14 with which the chip may be secured to the scan head 32, e.g. by clamping. The probe bearing side 17 is provided by the side from which probe 8 extends. A substrate facing side 16 of carrier element 13 is located opposite the mounting side 14.

Back to FIG. 1, during scanning, a dither piezo (not shown) or other means of actuations such as photo-thermal actuation, electrostatic, etc, may drive the cantilever in vibrational mode (for example close to resonant frequency), to enable tapping of the probe tip on the surface. The manner of applying a vibrational motion to the probe tip is known to the skilled person.

Scanning of the sample surface 3 is performed by moving the probe tip 10 in the X- and Y direction parallel to the sample surface 3 (or alternatively, by moving the substrate surface in the X- and Y-directions while maintaining the position of the probe tip fixed in the X- and Y-directions). The probe tip 10 is brought in close proximity to the surface 3 by means of a z-directional piezo driver. Once in the position, the probe tip 10 is vibrated in the z-direction such that it repeatedly touches the surface 3 during scanning thereof. At the same time, a laser 46 illuminates the probe tip with laser beam 45. The precise position in the z-direction is determined using photo diodes 48 which receive the reflected laser beam 45.

The sample surface 3 is carried using a sample carrier 34. Driving of the piezo drivers 33 located on the scan head 32 is performed using the detector and feedback electronics 50. At the same time, the detector and feedback electronics 50 receive the detected z position as determined using photo diodes 48. This principle allows for very precise mapping of surface elements, such as surface element 43 on the surface 3 of the sample 1. Atomic force microscopy performed e.g. using a technique as illustrated in FIG. 1 allows the mapping of very small structures and features on the surface, e.g. nanostructures having typical nanometer dimensions (e.g. even <1 nm, such as for example individual polymer strings being as thin as 0.4 nm).

Within the field scanning probe microscopy (SPM), such as atomic force microscopy (AFM), particular attention is paid to proper sensing and mapping of high aspect ratio features. High aspect ratio structures are structures on the surface of the substrate that comprise one or more sidewalls having an angle (relative to the normal on the surface) that is smaller than half the cone angle of the probe tip for e.g. a symmetric cone shaped or triangular prism shaped tip. For these high aspect ratio structures, the sidewalls are thus steeper than the angle of the probe tip. Therefore, the angle of the probe tip in these cases prevent accurate determination of the shape of the high aspect structure.

Figure 3A:
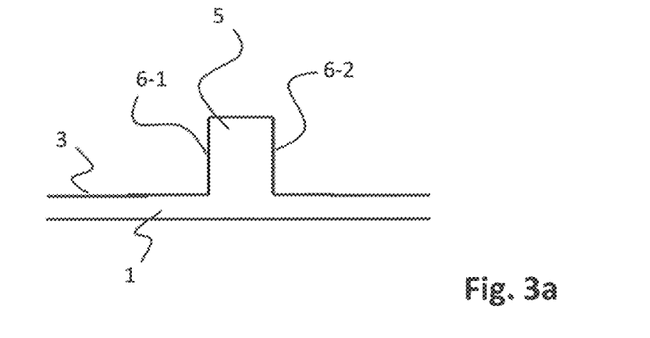
FIG. 3A to 3C illustrates the difficulties encountered when mapping high aspect ratio features with a scanning probe microscope.
Figure 3B:
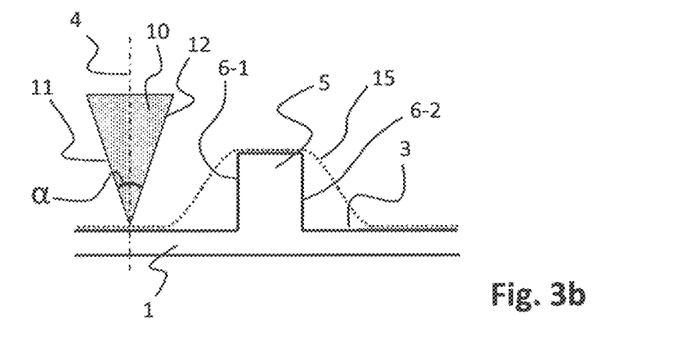
Figure 3C:
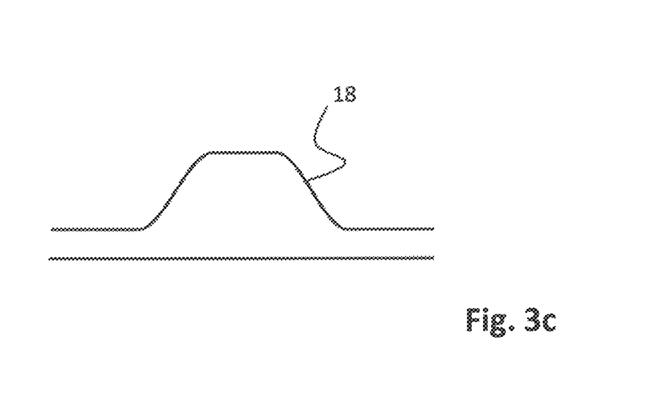

The problem is exemplarily illustrated in FIG. 3A to 3C. In FIG. 3A, a substrate 1 comprises a substrate surface 3 that is to be scanned using a scanning probe microscopy device in order to map the structures present on the surface 3. The surface 3 comprises a nanostructure 5. Nanostructure 5 comprises side walls 6-1 and 6-2 forming straight angles with the plane of the surface 3, i.e. being parallel to the normal through the surface 3. Thus, the angle between the surface 3 and any of the walls 6-1 or 6-2 is approximately $\pi/2$ radians. The angle between any of walls 6-1 and 6-2 and the normal to the surface is 0 radians.

In FIG. 3B, a probe tip 10 of the scanning probe device is schematically illustrated in cross section. The probe tip 10 is cone shaped, and the angle $\alpha$ is the angle between the opposing sides 11 and 12 of the probe tip which defines the sharpness of the cone. The axis 4 defines the axis of symmetry of the probe tip 10. If the surface would be flat or if it would only comprise shallow structures with gradual edges or side faces, there would be no trouble for the probe tip 10 to follow the surface perfectly accurate. In the situation of FIGS. 3A to 3C, the nanostructure 5 is a high aspect ratio nanostructure having very steep walls 6-1 and 6-2 relative to the surface 3. Defined differently, the angle between the normal through the surface 3 and any of the walls 6-1 or 6-2 of the nanostructure 5 is smaller than half of the angle $\alpha$ of the probe tip. In this situation, during scanning of the probe tip 10 across the surface 3, the probe tip follows the scan path 15. This scan path 15 is smoothed at an exaggerated amount upon encountering the walls 6-1 and 6-2. Smoothening is due to limited tip sharpness, and limited tip-sample control bandwidth.

The result of scanning of the high aspect ratio nanostructure 5 is illustrated in FIG. 3C which shows the resulting sensor signal 18 from the scan of nanostructure 5. The scanning probe microscopy device is not able to accurate map the walls 6-1 and 6-2 and the edges of the nanostructure 5.

Figure 4A:
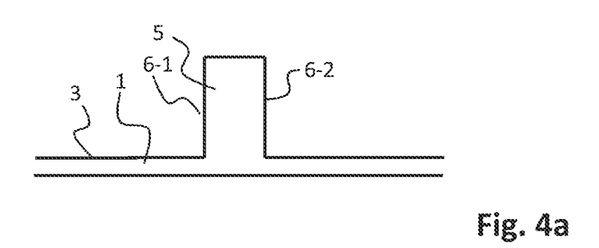
FIG. 4A to 4D illustrate an improved manner of mapping high aspect ratio features with a scanning probe microscope.
Figure 4B:
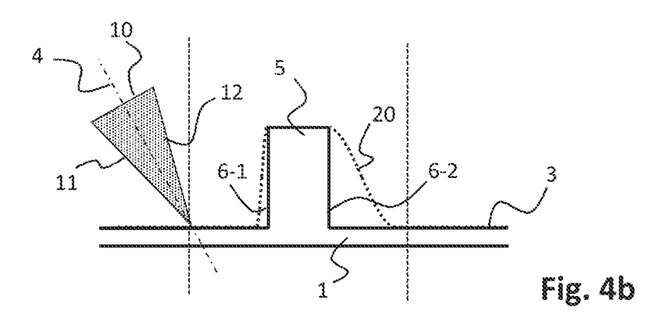
Figure 4C:
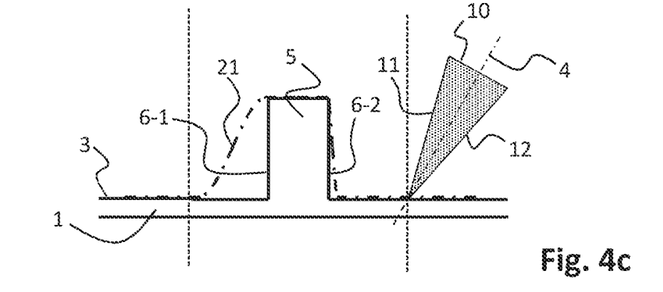

A known solution to overcome the above problem is illustrated in FIGS. 4A to 4C. FIG. 4A again shows the nanostructure 5 on the surface 3 of the substrate 1, having high aspect ratio side walls 6-1 and 6-2. To measure and map the walls 6-1 and 6-2 more accurately, scanning is now performed in two directions with a tilted probe tip 10, as illustrated in FIGS. 4B and 4C. In FIG. 4B, the probe tip 10 is tilted with its symmetry axis backward with respect to the scanning direction (which is in FIG. 4B from left to right). Due to the tilting, side 12 of probe tip 10 no longer limits the accuracy of the measurement upon encountering the wall 6-1. However, this gained accuracy for wall 6-1 comes at the cost of accuracy for sensing wall 6-2, because going from left to right with probe tip 10, the side 11 of the probe tip will limit accuracy of mapping even more at wall 6-2. This therefore results in scan path 20.

Figure 4D:
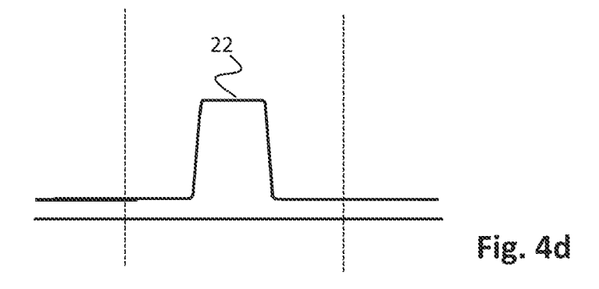

To resolve the inaccuracy at wall 6-2, the same scan is performed in the reverse direction by moving the probe tip 10 from right to left. This is illustrated in FIG. 4C. During scanning in the other direction, also the tilting of the probe tip is reversed. Probe tip 10 now follows scan path 21, which accurately maps wall 6-2 at the cost of accuracy at wall 6-1. The both paths 20 and 21 are combined, and the resulting sensor signal 22 providing the mapping of nanostructure 5 is illustrated in FIG. 4D. As can be seen, the walls 6-1 and 6-2 in FIG. 4D have been mapped at a much better accuracy as compared to the mapping result illustrated in FIG. 3C.

Figure 2:
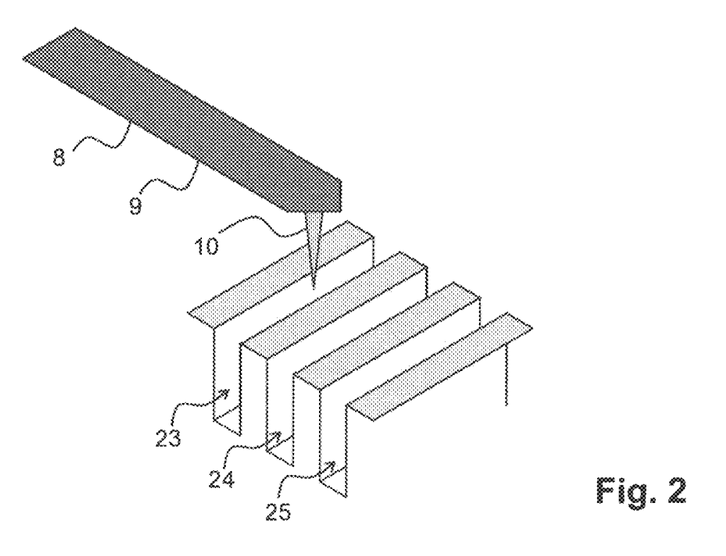
FIG. 2 schematically illustrates an example of measuring high aspect ratio features on a substrate surface using an atomic force microscope.

Although the above method works well for obtaining an accurate mapping of certain high aspect ratio structures, the measuring method cannot be applied under all circumstances. A particular challenge is provided by clusters of high aspect ratio features, an example of which is illustrated in FIG. 2. Here, a sequence of deep trenches 23, 24 and 25 is to be mapped using a probe 8. The trenches 23, 24 and 25 in FIG. 2, may for example have a depth of 100 nanometers (100 nm) and a width (e.g. between trenches 23 and 24) of 30 nanometer. Using a conventional high aspect ratio probe in a method as illustrated in FIGS. 4A to 4D, the possibilities for accurate mapping of such structures are limited. As may be appreciated, this accuracy is limited for example by the depth of the trenches 23, 24 and 25 with respect to the dimensions of the cantilever 9 and probe tip 10. Also the tilt angle achievable with the probe 8, taking the dimensions of the probe tip 10 and the limitations of the AFM system into account, limits the accuracy achievable. The tilt angle, in turn, is limited by the dimensions of the probe chip upon which the probe 8 is mounted.

Figure 6A:
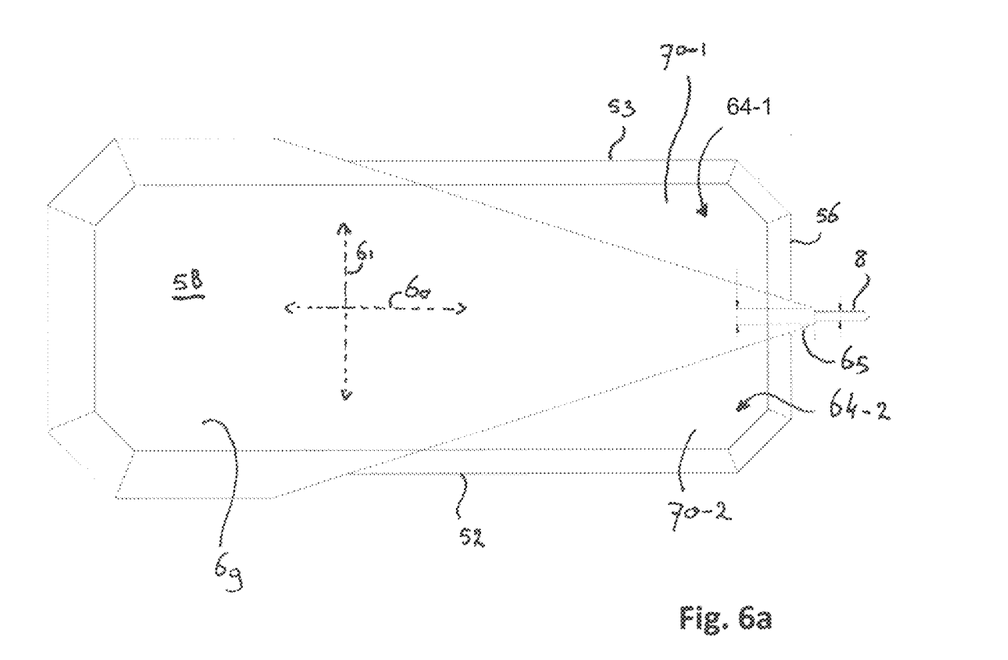
FIGS. 6A and 6B illustrate a probe chip design in accordance with the principles of the present invention.
Figure 6B:
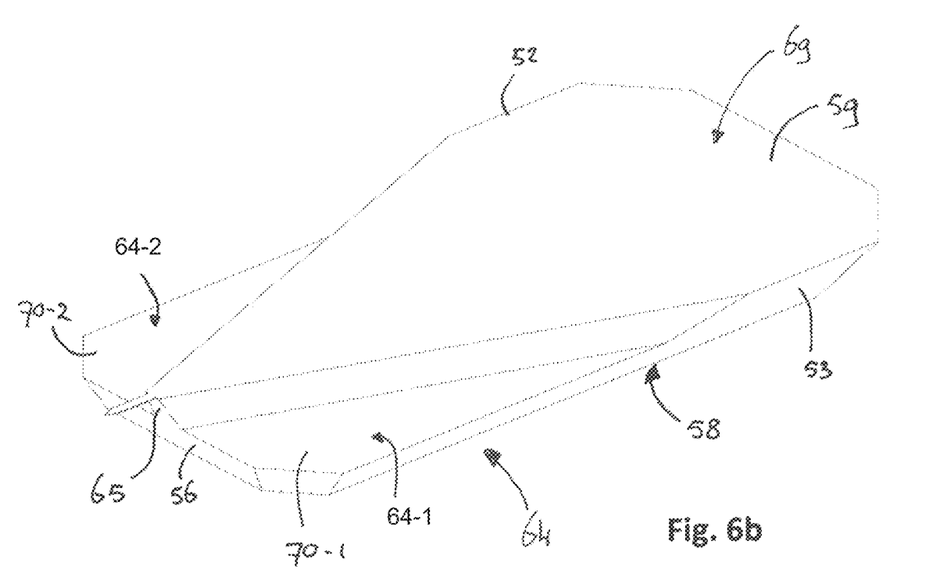

FIGS. 6A and 6B schematically illustrate a probe chip 52 in accordance with an embodiment of the invention, for use in an atomic force microscopy device for holding a probe 8 extending therefrom. The probe chip 52 includes a carrier element 53 having a probe bearing side 56 from which the probe 8 extends as an integral part thereof. The carrier element 53 further comprises a mounting side 58 configured for mounting the probe chip 52 onto a scan head 32 of the atomic force microscopy device. The mounting side 58 extends in a longitudinal 60 and lateral direction 61 of the carrier element. 53, and provides a flat surface. Opposite the mounting side 58, the substrate facing side 59 in use faces a substrate 1 to be scanned. The longitudinal direction 60 is the direction parallel to or coinciding with a direction wherein the probe 8 extends from the probe bearing side 56. The lateral direction 61 is transverse to the longitudinal direction 60 and transverse to the thickness of the carrier element 53. The carrier element 53 towards the probe bearing side 56 thereof is truncated in the lateral direction 61 on either side of a longitudinal axis 60 through a center of the carrier element 53. This enables a rotation of the probe chip 52 over a rotation angle ψ around the longitudinal axis 60, when in use the longitudinal axis 60 is inclined at an inclination angle θ relative to a substrate surface 3 to be scanned and when the probe 8 is in a measurement position relative to the substrate surface 3.

The truncation 64 is provided such that the shape of the carrier element 53, at least from the substrate facing side 59 over at least part of the thickness, and at least towards the probe bearing side 56, cuts away the material of the carrier element to result in a narrow end portion 65. The end portion 65 is sufficiently narrow to enable the rotation around the longitudinal direction, i.e. over the rotation angle ψ. For example, the narrow end portion 65 may be as wide as the width of the cantilever 9 of the probe 8. But it may also be wider than that, as long as it will not touch the substrate surface 3 upon rotation. For example, the narrow end portion 65 may be within twice the width of the cantilever 9, or within five times the width of the cantilever 9, or possibly even within ten times the width of the cantilever 9.

To provide the probe chip 52 with sufficient mechanical stability and integrity, preferably (though not essentially), the truncation 64 may be provided such that the amount of material of the carrier element 53 in the lateral direction 61 increases towards the back part 69 of the carrier element 53. This may be achieved by a suitable shape of the truncation 64.

In the embodiment of FIGS. 6A and 6B, the truncation is provided in the form of recess portions 64-1 and 64-2 located on either side of the longitudinal axis 60, as illustrated in FIGS. 6A and 6B. The recess portions 64-1 and 64-2 are triangularly shaped and cut away the material of the carrier element 53 over part of the thickness from the substrate facing side 59 towards the mounting side 58. In alternative embodiments, the recesses may complete cut-away the material over the full thickness of the carrier element 53, leaving at least the narrow end portion 65. However, in the embodiment of FIGS. 6A and 6B, the recesses portions 64-1 and 64-2 forming the truncation 64 cut away the material over only a part of the thickness of the carrier element 53, thereby providing wing sections 70-1 and 70-2 on the carrier element 53 which provide additional torsional and bending stability to the probe chip 52. As may be appreciated, the dimensions of the recess portion 64-1 and 64-2 in the thickness direction may be tuned to provide preferential mechanical stability properties. Moreover, also the shape of the recess portions 64-1 and 64-2 in the longitudinal and lateral directions 60 and 61 may be adapted, for example dependent on the desired ranges for the angles of rotation ψ and inclination θ. To this end, reference is made to FIGS. 7A to 7C.

Figure 5:
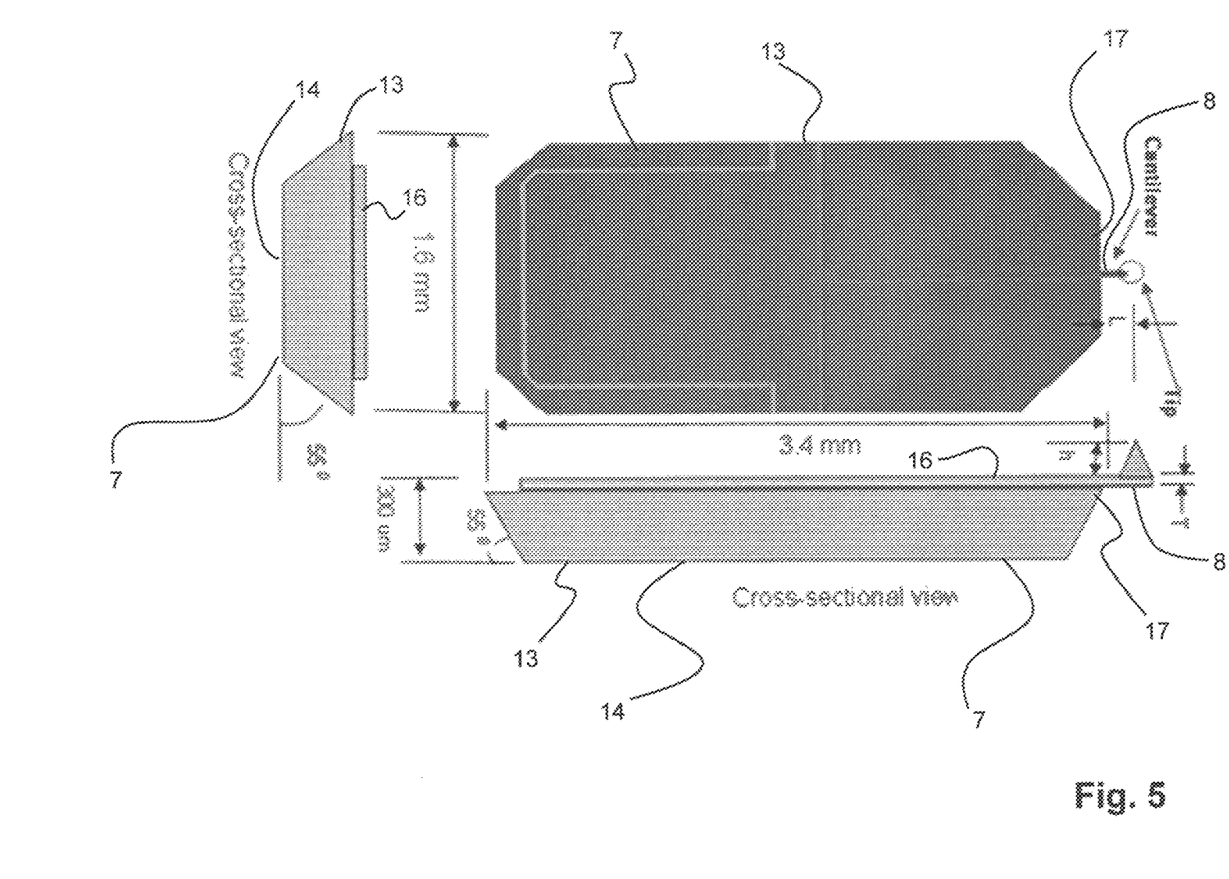
FIG. 5 illustrates a standard conventional probe chip design in side view, aft view and bottom view.
Figure 7A:
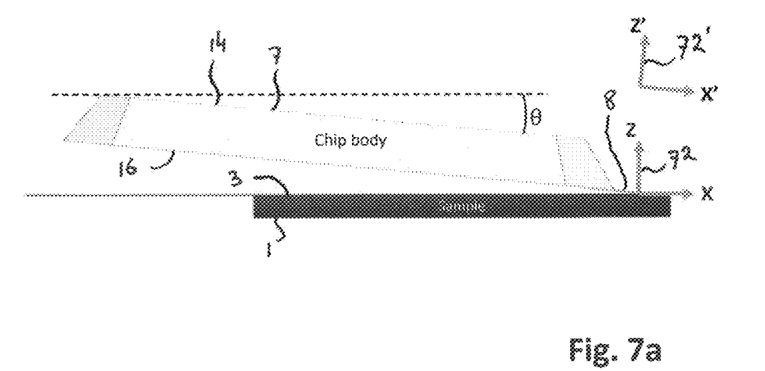
FIG. 7A to 7C illustrate the working principle of an inventive probe chip by reference to the rotation of a standard probe tip above a substrate surface.
Figure 7B:
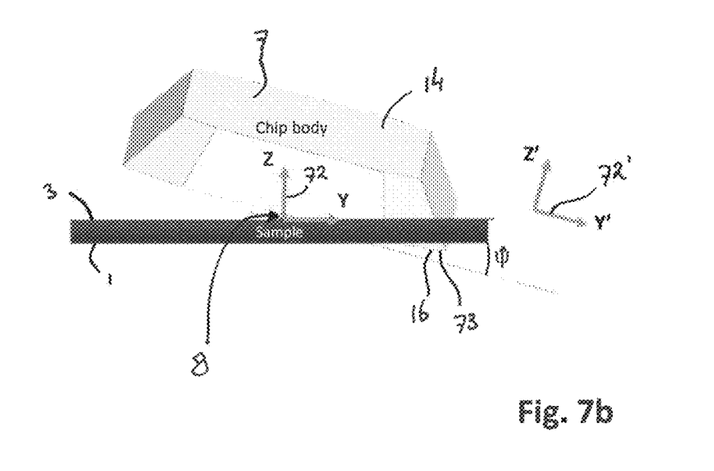
Figure 7C:
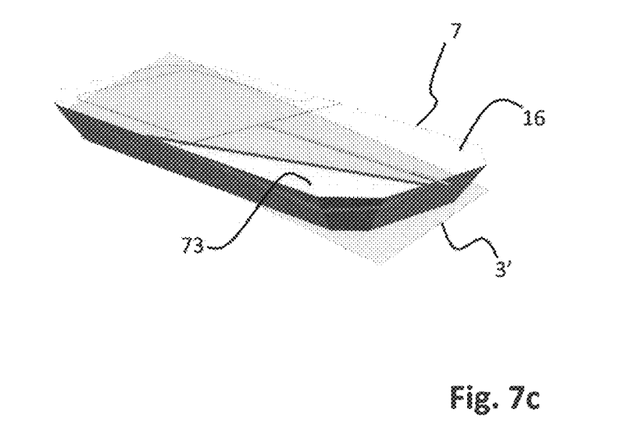

In FIGS. 7A to 7C, a convention standard probe chip 7 is illustrated, similar to the probe chip 7 illustrated in FIG. 5. FIG. 7A to 7C illustrate how the probe chip 7, due to its design, prevent the AFM system from axially rotating the probe 8 over its longitudinal axis. FIG. 7A provides a side view of the probe chip 7 above a substrate surface 3. The probe chip 7 is inclined (tilted) over an angle θ relative to the surface 3 of the substrate 1. Reference coordinate system 72 provides the reference coordinate system of the substrate 1, and has its x- and y-axis parallel to the surface 3 of the substrate. The reference coordinate system 72' is aligned with its x- and y-axes to the mounting surface 14. As can be seen in FIG. 7B, if the probe chip 7 would further be rotated over an angle ψ around the longitudinal axis, a section 73 of the surface facing side 16 of the probe chip 7 would end up below the surface 3 of the substrate. Thus, rotation of the probe 8 around its longitudinal axis is prevented by the design of probe chip 7. This is further illustrated in FIG. 7C, which shows the full size and shape of the section 73 that would end up below the surface 3 of the substrate 1. The plane 3' virtually indicates the location of the substrate surface 3. FIG. 7C likewise shows how a recess portion, such as recess portion 64-2 of FIGS. 6A and 6B, enables the probe 8 to be rotated while still preserving most of the mechanical stability of the probe chip 52. The recess portion 64-2 of the embodiment of FIGS. 6A and 6B is correspondingly shaped with the section 73 at least in the longitudinal and lateral directions 60 and 61 in FIGS. 6A and 6B. Recess portion 64-1 is similarly shaped, but mirrored relative to a plane through the longitudinal axis 60.

Figure 8:
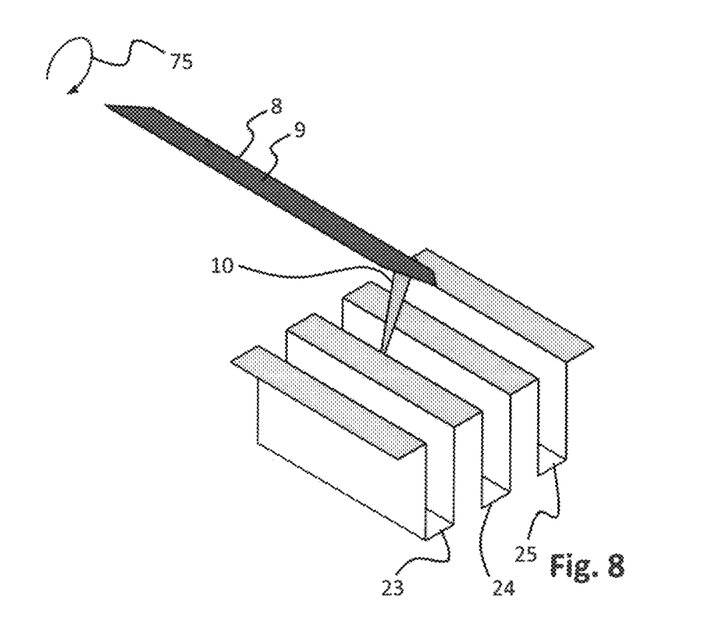
FIG. 8 illustrate a use of a probe chip according to the first aspect in a scanning probe microscopy method for mapping one or more surface structures on a surface of a substrate.

FIG. 8 illustrates the mode of operation of the probe 8, made possible as a result of the recess portions 64-1 and 64-2, and how it contributes to accurate mapping of the trenches 23, 24 and 25. Sideways rotation (i.e. over its longitudinal axis) is indicated by arrow 75. The probe 8 and cantilever 9 are optimized to allow torsional deformation at least sufficient to detect a deformation in the torsional direction upon the probe tip 10 touching the side walls of the trenches 23, 24 and 25. Such detection may optionally be acted upon by a controller, for example by performing an adjustment to a positioning of the probe to enable the probe to follow a feature topology. The probe can be properly inclined over an axis θ similar to the inclination illustrated in FIGS. 7A to 7C. Additionally, sideways rotation 75 causes the probe tip 10 to touch the surfaces of the sidewalls, to enable following the shape of the side walls of trenches 23, 24 and 25 accurately. The sideways rotation required for mapping the structure accurately may be provide by a tilting the probe until the probe tip contacts the side walls, after which a scanning motion is made to follow the wall. Alternatively or additionally, the probe tip may be brought in a lateral sideways rotating vibration, such that it frequently contacts one or occasionally both the side walls of the trenches at either side. The latter can be useful in combination with the invention as it can increase sensitivity to lateral forces, and may occasionally obviate the need for an additional scan in the counter direction, as was needed for the conventional manner of mapping high aspect ratio features.

Figure 9:
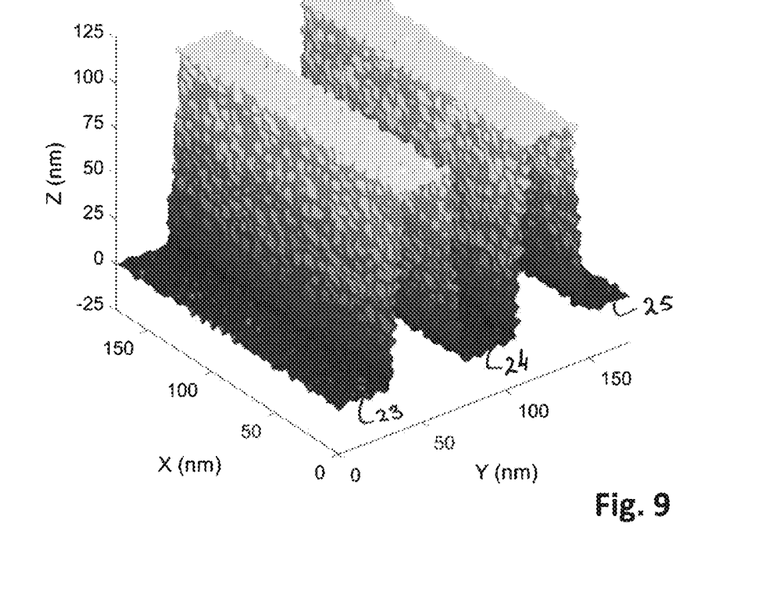
FIG. 9 illustrates a 3D mapping of a high aspect ratio featured part of a substrate.
Figure 10:
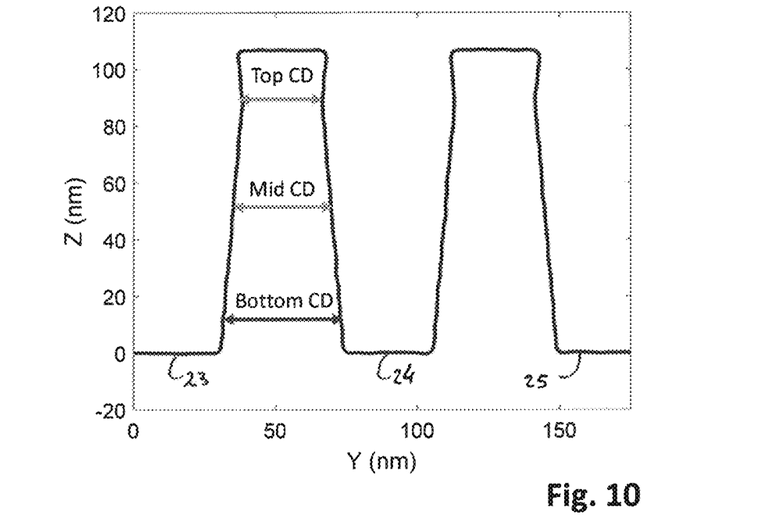
FIG. 10 illustrates a cross section measurement of the high aspect ratio featured part of FIG. 9.

FIG. 9 illustrates a mapping of such trenches 23, 24 and 25 that may be obtained using a probe chip in accordance with the present invention. The trenches are 100 nanometer deep and 30 nanometer wide. A cross sectional mapping is provided by FIG. 10, wherein the critical dimensions are indicated. Clearly, the probe chip of the present invention, such as probe chip 52, allows to follow the shape of the trenches accurately.

Figure 11A:
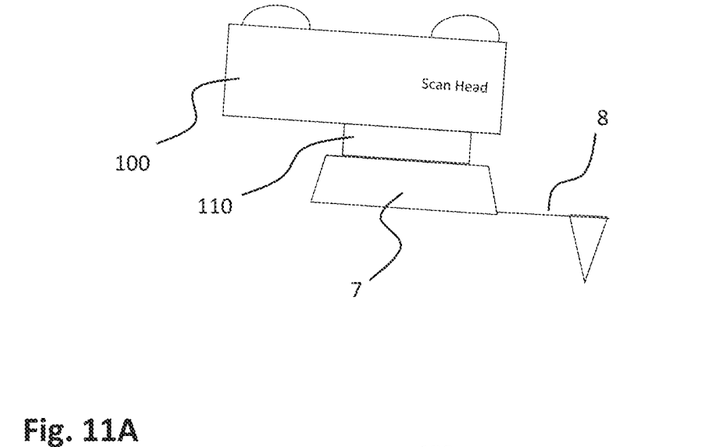
FIGS. 11A, 11B and 11C schematically illustrate a scan head including a mounting arrangement for incorporation into a scanning probe microscopy device in accordance with the disclosure.
Figure 11B:
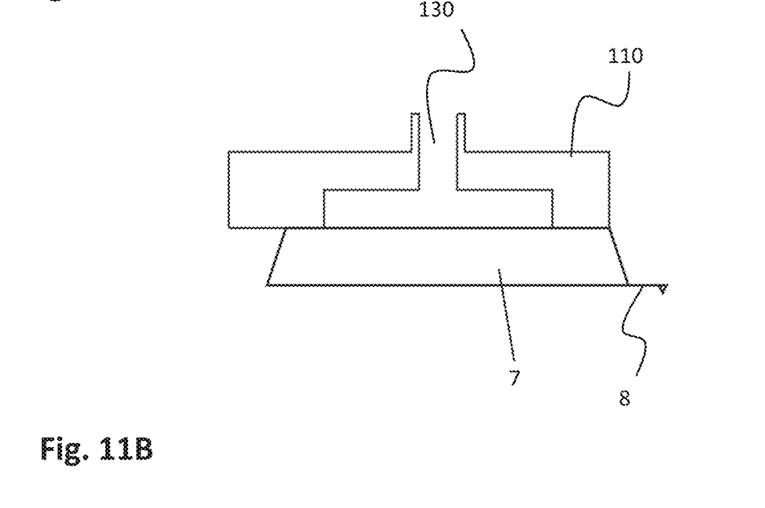
Figure 11C:
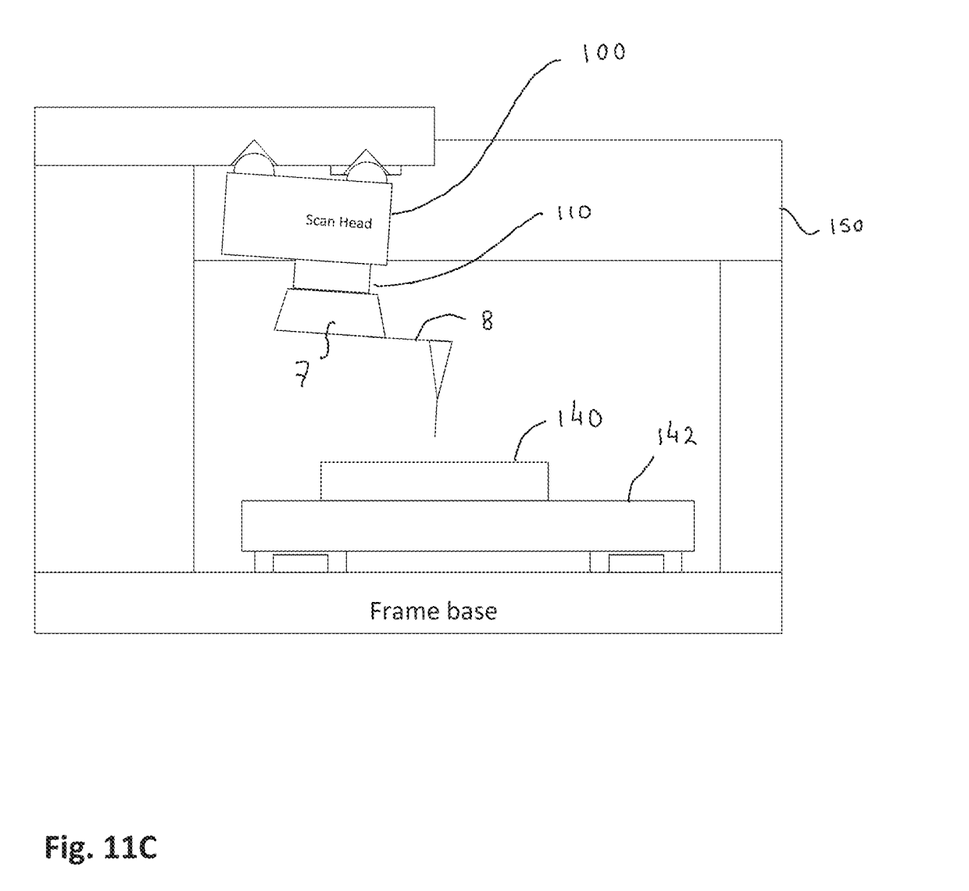

FIG. 11A schematically illustrates a scan head 100, including a mounting arrangement 110 for mounting a probe chip 7 including a probe 8. FIG. 11B illustrates the mounting arrangement 110 including a vacuum clamp 130. FIG. 11C includes a scanning probe microscopy device including a metrology frame 150, a scan head 100 and a substrate carrier 142 supporting a substrate 140.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. A probe chip for use in a scanning probe microscopy device for holding a probe mounted thereon, the probe chip including a carrier element having a probe bearing side, the probe bearing side being configured for bearing the probe to be extending therefrom as an integral or mounted part thereof, the carrier element further comprising a mounting side configured for mounting the probe chip onto a scan head of the scanning probe microscopy device,
    wherein the mounting side extends in a longitudinal and lateral direction of the carrier element to be substantially flat, wherein the longitudinal direction is defined as a direction parallel to or coinciding with a direction wherein the probe is to be extending from the probe bearing side, and wherein the lateral direction is transverse to the longitudinal direction and transverse to a thickness of the carrier element,
    wherein the carrier element, towards the probe bearing side thereof, exhibits truncation in the lateral direction on each side of a longitudinal axis through a center of the carrier element,
    wherein the truncation is a narrowing of the carrier element towards the probe bearing side provided by cut-out portions that extend partly through the thickness of the carrier element but leave the mounting side intact, such that the mounting side is approximately as wide in the lateral direction at the probe-bearing side as the opposite side; and
    wherein the truncation of the carrier element is shaped such that the amount of material of the carrier element in the lateral direction increases over a length of the carrier element towards a back part of the carrier element opposite the probe bearing side of the carrier element.

2. The probe chip according to claim 1, wherein the inclination angle is smaller than 20 degrees.

3. The probe chip according to claim 1, wherein the rotation angle, in either a positive or a negative rotation direction, supports rotation between at least 0 and 10 degrees.

4. The probe chip according to claim 1, wherein the truncation of the carrier element towards the probe bearing side thereof is provided by cut-out portions on each side of the longitudinal axis.

5. The probe chip according to claim 4, wherein the probe comprises a cantilever and a probe tip, and wherein the cut-out portions result in the carrier element at the probe bearing side thereof comprising a narrow end portion,
    wherein the narrow end portion, at least at a location from where probe extends, has a width that is smaller than or equal to 10 times a width of the cantilever.

6. The probe chip according to claim 1, wherein a shape of the recess portions in the lateral and longitudinal directions is at least one of the group consisting of: triangular, trapezoid, rectangular, parallelogram shaped, and arbitrarily shaped.

7. The probe chip according to claim 1 further comprising at least one of:
    a first one of the recess portions reduces the thickness of the carrier element with a first depth and a second one of the recess portions reduces the thickness of the carrier element with a first depth; or
    at least one of the recess portions having two or more depth sections, each depth section reducing the thickness of the carrier element with a respective depth.

8. The probe chip according to claim 1, wherein the probe bearing side comprises the probe extending therefrom as an integral part, and
    wherein the probe comprises a cantilever and a probe tip, the cantilever being configured for deformation upon exerting thereon a lateral force.

9. The probe chip according to claim 8, wherein said deformation of the cantilever responsive to the lateral force is at least one of: a torsional or a lateral deformation.

10. A method for operation the probe chip according to claim 1 in a scanning probe microscopy operation that maps one or more surface structures on a surface of a substrate, the method comprising rotating the probe chip over a rotation angle around the longitudinal axis in use when the longitudinal axis is inclined at an inclination angle relative to a substrate surface to be scanned and when the probe is in a measurement position relative to the substrate surface.

11. The method according to claim 10, further including receiving a return signal from the probe which is indicative of a torsional deformation of the cantilever, and upon detecting the torsional deformation performing an adjustment to a positioning of the probe so as to enable the probe to follow a feature topology.

12. The probe chip according to claim 1, wherein the truncation of the carrier element towards the probe bearing side thereof is provided by recess portions, wherein the recess portions at least reduce the thickness of the carrier element, such that a further part of the carrier element is present contiguous to the recess portions in the direction of thickness of the carrier element.

13. A scan head for use in a scanning probe microscopy device for holding a probe chip for holding a probe mounted thereon,
wherein the probe chip includes a carrier element having a probe bearing side, the probe bearing side being configured for bearing the probe to be extending therefrom as an integral or mounted part thereof, the carrier element further comprising a mounting side configured for mounting the probe chip onto a scan head of the scanning probe microscopy device,
wherein the mounting side extends in a longitudinal and lateral direction of the carrier element to be substantially flat, wherein the longitudinal direction is defined as a direction parallel to or coinciding with a direction wherein the probe is to be extending from the probe bearing side, and wherein the lateral direction is transverse to the longitudinal direction and transverse to a thickness of the carrier element,
wherein the carrier element, towards the probe bearing side thereof, exhibits truncation in the lateral direction on each side of a longitudinal axis through a center of the carrier element,
wherein the truncation is a narrowing of the carrier element towards the probe bearing side provided by cut-out portions that extend partly through the thickness of the carrier element but leave the mounting side intact, such that the mounting side is approximately as wide in the lateral direction at the probe-bearing side as the opposite side; and
wherein the scan head comprises a mounting arrangement for enabling mounting of the probe chip onto the scan head, and
wherein the mounting arrangement cooperates with the probe chip for fixing the probe chip in use.

14. The scan head according to claim 13, wherein the scan head is further arranged for rotating the probe chip over a rotation angle around the longitudinal axis, when the longitudinal axis is inclined at an inclination angle relative to a substrate surface to be scanned and when the probe is in a measurement position relative to the substrate surface.

15. The scan head according to claim 13, wherein the mounting arrangement is provided in a form of at least one of the group consisting of:
a mechanical clamp for clamping the carrier element,
a vacuum clamp including a suction element cooperating with a surface of the carrier element for fixing the probe chip, and
an electrostatic clamp including a clamping electrode for applying an electric field for exerting an electrostatic force on the carrier element.

16. A scanning probe microscopy device comprising:
probe chip for use in a scanning probe microscopy device for holding a probe mounted thereon, the probe chip including a carrier element having a probe bearing side, the probe bearing side being configured for bearing the probe to be extending therefrom as an integral or mounted part thereof, the carrier element further comprising a mounting side configured for mounting the probe chip onto a scan head of the scanning probe microscopy device,
wherein the mounting side extends in a longitudinal and lateral direction of the carrier element to be substantially flat, wherein the longitudinal direction is defined as a direction parallel to or coinciding with a direction wherein the probe is to be extending from the probe bearing side, and wherein the lateral direction is transverse to the longitudinal direction and transverse to a thickness of the carrier element,
wherein the carrier element, towards the probe bearing side thereof, exhibits truncation in the lateral direction on each side of a longitudinal axis through a center of the carrier element,
wherein the truncation is a narrowing of the carrier element towards the probe bearing side provided by cut-out portions that extend partly through the thickness of the carrier element but leave the mounting side intact, such that the mounting side is approximately as wide in the lateral direction at the probe-bearing side as the opposite side; and
wherein the truncation of the carrier element is shaped such that the amount of material of the carrier element in the lateral direction increases over a length of the carrier element towards a back part of the carrier element opposite the probe bearing side of the carrier element.

17. The scanning probe microscopy device of claim 16 further comprising a scan head for holding the probe chip, wherein the scan head comprises a mounting arrangement for enabling mounting of the probe chip onto the scan head, and wherein the mounting arrangement cooperates with the probe chip for fixing the probe chip in use.

18. The scanning probe microscopy device to claim 16, wherein the truncation of the carrier element towards the probe bearing side thereof is provided by recess portions, wherein the recess portions at least reduce the thickness of the carrier element, such that a further part of the carrier element is present contiguous to the recess portions in the direction of thickness of the carrier element.

* * * * *